United States Patent
Hu et al.

(10) Patent No.: US 12,174,301 B2
(45) Date of Patent: Dec. 24, 2024

(54) ONLINE VALIDATION OF LIDAR-TO-LIDAR ALIGNMENT AND LIDAR-TO-VEHICLE ALIGNMENT

(71) Applicant: GM GLOBAL TECHNOLOGY OPERATIONS LLC, Detroit, MI (US)

(72) Inventors: Yao Hu, Sterling Heights, MI (US); Xinyu Du, Oakland Township, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 849 days.

(21) Appl. No.: 17/350,780

(22) Filed: Jun. 17, 2021

(65) Prior Publication Data
US 2022/0404506 A1 Dec. 22, 2022

(51) Int. Cl.
*G01S 17/931* (2020.01)
*B60W 60/00* (2020.01)

(52) U.S. Cl.
CPC ......... *G01S 17/931* (2020.01); *B60W 60/001* (2020.02); *B60W 2420/408* (2024.01); *B60W 2520/14* (2013.01); *B60W 2520/18* (2013.01)

(58) Field of Classification Search
CPC .... G01S 17/931; G01S 7/4808; G01S 7/4981; G01S 17/87; B60W 60/001; B60W 2420/408; B60W 2520/14; B60W 2520/18; G06T 7/30; G06T 7/0002; G06T 7/70; G06T 2207/10028; G06T 2207/30252
See application file for complete search history.

(56) References Cited

U.S. PATENT DOCUMENTS

| | | | |
|---|---|---|---|
| 10,705,194 B2 * | 7/2020 | Pfeiffer | G01S 17/931 |
| 10,983,199 B2 * | 4/2021 | Adams | G01S 17/42 |
| 11,619,724 B2 * | 4/2023 | Zeng | G01S 7/4808 356/4.01 |
| 11,623,494 B1 * | 4/2023 | Arnicar | G01S 17/931 701/37 |

(Continued)

OTHER PUBLICATIONS

U.S. Appl. No. 16/887,397, filed May 29, 2020, Jiang et al.

(Continued)

*Primary Examiner* — Thomas Ingram

(57) ABSTRACT

A LIDAR-to-LIDAR alignment system includes a memory and an autonomous driving module. The memory stores first and second points based on outputs of first and second LIDAR sensors. The autonomous driving module performs a validation process to determine whether alignment of the LIDAR sensors satisfy an alignment condition. The validation process includes: aggregating the first and second points in a vehicle coordinate system to provide aggregated LIDAR points; based on the aggregated LIDAR points, performing (i) a first method including determining pitch and roll differences between the first and second LIDAR sensors, (ii) a second method including determining a yaw difference between the first and second LIDAR sensors, or (iii) point cloud registration to determine rotation and translation differences between the first and second LIDAR sensors; and based on results of the first method, the second method or the point cloud registration, determining whether the alignment condition is satisfied.

18 Claims, 8 Drawing Sheets

(56) References Cited

U.S. PATENT DOCUMENTS

| | | | |
|---|---|---|---|
| 11,994,616 B2* | 5/2024 | Zhu | G01S 7/403 |
| 11,994,631 B2* | 5/2024 | Liao | G06T 19/20 |
| 2019/0049242 A1* | 2/2019 | Adams | G01B 21/16 |
| 2019/0049566 A1* | 2/2019 | Adams | G01C 25/00 |
| 2021/0109205 A1* | 4/2021 | Liao | G06T 19/20 |
| 2021/0356562 A1* | 11/2021 | Liu | G01S 7/4808 |
| 2022/0050191 A1* | 2/2022 | Zhu | G01S 17/89 |
| 2023/0213633 A1* | 7/2023 | Du | G01S 7/4972 |
| | | | 701/27 |
| 2024/0017731 A1* | 1/2024 | Fasola | G01S 17/87 |

OTHER PUBLICATIONS

Segal, A. et al. "Generalized-ICP" Robotics: Science and Systems, RSS, Seattle, USA, 2009, pp. 26-27.

Bogoslavskyi, I. et al. "Efficient Online Segmentation for Sparse 3D Laser Scans" URL: http://www.ipb.uni-bonn.de/pdfs/bogoslavskyi16pfg.pdf; Manuscript accepted: Dec. 2016.

* cited by examiner

ONLINE VALIDATION OF LIDAR-TO-LIDAR ALIGNMENT AND LIDAR-TO-VEHICLE ALIGNMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle object detection systems, and more particularly to vehicle light detection and ranging (LIDAR) systems.

Vehicles can include various sensors for detecting a surrounding environment and objects in that environment. The sensors may include cameras, radio detection and ranging (RADAR) sensors, LIDAR sensors, etc. A vehicle controller can, in response to the detected surroundings, perform various operations. The operations can include performing partial and/or fully autonomous vehicle operations, collision avoidance operations, and informational reporting operations. The accuracy of the performed operations can be based on the accuracy of the data collected from the sensors.

SUMMARY

A LIDAR-to-LIDAR alignment system is provided and includes a memory and an autonomous driving module. The memory is configured to store (i) first points of data provided based on an output of a first LIDAR sensor, and (ii) second points of data provided based on an output of a second LIDAR sensor. The autonomous driving module is configured to perform a validation process to determine whether alignment of the first LIDAR sensor and the second LIDAR sensor satisfy one or more alignment conditions. The validation process includes: aggregating the first points of data and the second points of data in a vehicle coordinate system to provide aggregated LIDAR points; based on the aggregated LIDAR points, at least one of (i) performing a first method including determining pitch and roll differences between the first LIDAR sensor and the second LIDAR sensor, (ii) performing a second method including determining a yaw difference between the first LIDAR sensor and the second LIDAR sensor, or (iii) performing point cloud registration to determine rotation and translation differences between the first LIDAR sensor and the second LIDAR sensor; based on results of at least one of the first method, the second method or the point cloud registration, determining whether the one or more alignment conditions are satisfied; and in response to the one or more alignment conditions not being satisfied, recalibrating at least one of the first LIDAR sensor or the second LIDAR sensor.

In other features, the autonomous driving module is further configured to: determine whether multiple enabling conditions are satisfied including two or more of determining whether the vehicle is moving, determining whether the vehicle is in a known location, determining whether a velocity of the vehicle is greater than a predetermined velocity, determining whether an acceleration rate of the vehicle is greater than a predetermined acceleration rate, or determining whether a yaw rate is greater than a predetermined yaw rate; and in response to the enabling conditions being satisfied, aggregating the first points of data and the second points of data.

In other features, the aggregating of the first points of data and the second points of data includes: performing point registration to map the first points of data at a first time in a coordinate system of the first LIDAR sensor at a second time; aggregating the mapped first points of data from the first LIDAR sensor to provide first aggregated points; performing point registration to map the second points of data at the first time in a coordinate system of the second LIDAR sensor at the second time; and aggregating the mapped second points of data from the second LIDAR sensor to provide second aggregated points.

In other features, the aggregating of the first points of data and the second points of data further includes: mapping the first aggregated points to the vehicle coordinate system based on a rotation calibration value and a translation calibration value for the first LIDAR sensor; and mapping the second aggregated points to the vehicle coordinate system based on a rotation calibration value and a translation calibration value for the second LIDAR sensor.

In other features, the aggregating of the first points of data and the second points of data includes: mapping first points of data to the vehicle coordinate system based on a rotation calibration value and a translation calibration value for the first LIDAR sensor; and mapping the second points of data to the vehicle coordinate system based on a rotation calibration value and a translation calibration value for the second LIDAR sensor.

In other features, the autonomous driving module is configured to: based on aggregated LIDAR points, perform ground fitting and selecting to provide first selected points of the first LIDAR sensor in a ground area and second selected points of the second LIDAR sensor in the ground area; and perform the first method based on the first selected points and the second selected points.

In other features, the autonomous driving module is configured to perform the first method and, based on results of the first method, determine whether the one or more alignment conditions are satisfied.

In other features, the autonomous driving module is configured to perform the second method, based on results of the second method, determine whether the one or more alignment conditions are satisfied.

In other features, the autonomous driving module is configured to perform the point cloud registration and, based on results of the point cloud registration, determine whether the one or more alignment conditions are satisfied.

In other features, the autonomous driving module is configured to perform the first method, the second method and the point cloud registration and, based on results of the first method, the second method and the point cloud registration, determine whether the one or more alignment conditions are satisfied.

In other features, the autonomous driving module is configured to: integrate results from one or more of the first method, the second method and the point cloud registration including determining a weighted sum of a vector of difference values for six degrees of freedom; and in response to one or more of the difference values exceeding a predetermined threshold, at least one of (i) identifying one or more of the first LIDAR sensor and the second LIDAR sensor as suspicious, or (ii) recalibrating the one or more of the first LIDAR sensor and the second LIDAR sensor.

In other features, the autonomous driving module is configured to, based on knowing a transform from the first LIDAR sensor coordinate system to the vehicle coordinate system is accurate and the weighted sum of the vector of difference values, determine whether transform from the second LIDAR sensor coordinate system to the vehicle coordinate system is accurate.

In other features, the autonomous driving module is configured to, based on alignment results of the first LIDAR sensor to the vehicle and results of the second LIDAR sensor to the vehicle, calculate six degrees of freedom difference values between the first LIDAR sensor and the second LIDAR sensor.

In other features, a LIDAR-to-LIDAR alignment validation method is provided and includes: aggregating first points of data and the second points of data in a vehicle coordinate system to provide aggregated LIDAR points, where the first points of data are provided based on an output of a first LIDAR sensor, and the second points of data are provided based on an output of a second LIDAR sensor; based on the aggregated LIDAR points, at least one of (i) performing a first method including determining pitch and roll differences between the first LIDAR sensor and the second LIDAR sensor, (ii) performing a second method including determining a yaw difference between the first LIDAR sensor and the second LIDAR sensor, or (iii) performing point cloud registration to determine rotation and translation differences between the first LIDAR sensor and the second LIDAR sensor; based on results of at least one of the first method, the second method or the point cloud registration, determining whether the one or more alignment conditions are satisfied; and in response to the one or more alignment conditions not being satisfied, recalibrating at least one of the first LIDAR sensor or the second LIDAR sensor.

In other features, the method further includes: determining whether multiple enabling conditions are satisfied including two or more of determining whether the vehicle is moving, determining whether the vehicle is in a known location, determining whether a velocity of the vehicle is greater than a predetermined velocity, determining whether an acceleration rate of the vehicle is greater than a predetermined acceleration rate, or determining whether a yaw rate is greater than a predetermined yaw rate; and in response to the enabling conditions being satisfied, aggregating the first points of data and the second points of data.

In other features, the aggregating of the first points of data and the second points of data includes: performing point registration to map the first points of data at a first time in a coordinate system of the first LIDAR sensor at a second time; aggregating the mapped first points of data from the first LIDAR sensor to provide first aggregated points; performing point registration to map the second points of data at the first time in a coordinate system of the second LIDAR sensor at the second time; aggregating the mapped second points of data from the second LIDAR sensor to provide second aggregated points; mapping the first aggregated points to the vehicle coordinate system based on a rotation calibration value and a translation calibration value for the first LIDAR sensor; and mapping the second aggregated points to the vehicle coordinate system based on a rotation calibration value and a translation calibration value for the second LIDAR sensor.

In other features, the method further includes: based on aggregated LIDAR points, performing ground fitting and selecting to provide first selected points of the first LIDAR sensor in a ground area and second selected points of the second LIDAR sensor in the ground area; and performing the first method based on the first selected points and the second selected points.

In other features, the method further includes performing the first method and the second method and, based on results of the first method and the second method, determining whether the one or more alignment conditions are satisfied.

In other features, the method further includes performing the point cloud registration and, based on results of the point cloud registration, determining whether the one or more alignment conditions are satisfied.

In other features, the method further includes performing the first method, the second method and the point cloud registration and, based on results of the first method, the second method and the point cloud registration, determine whether the one or more alignment conditions are satisfied.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
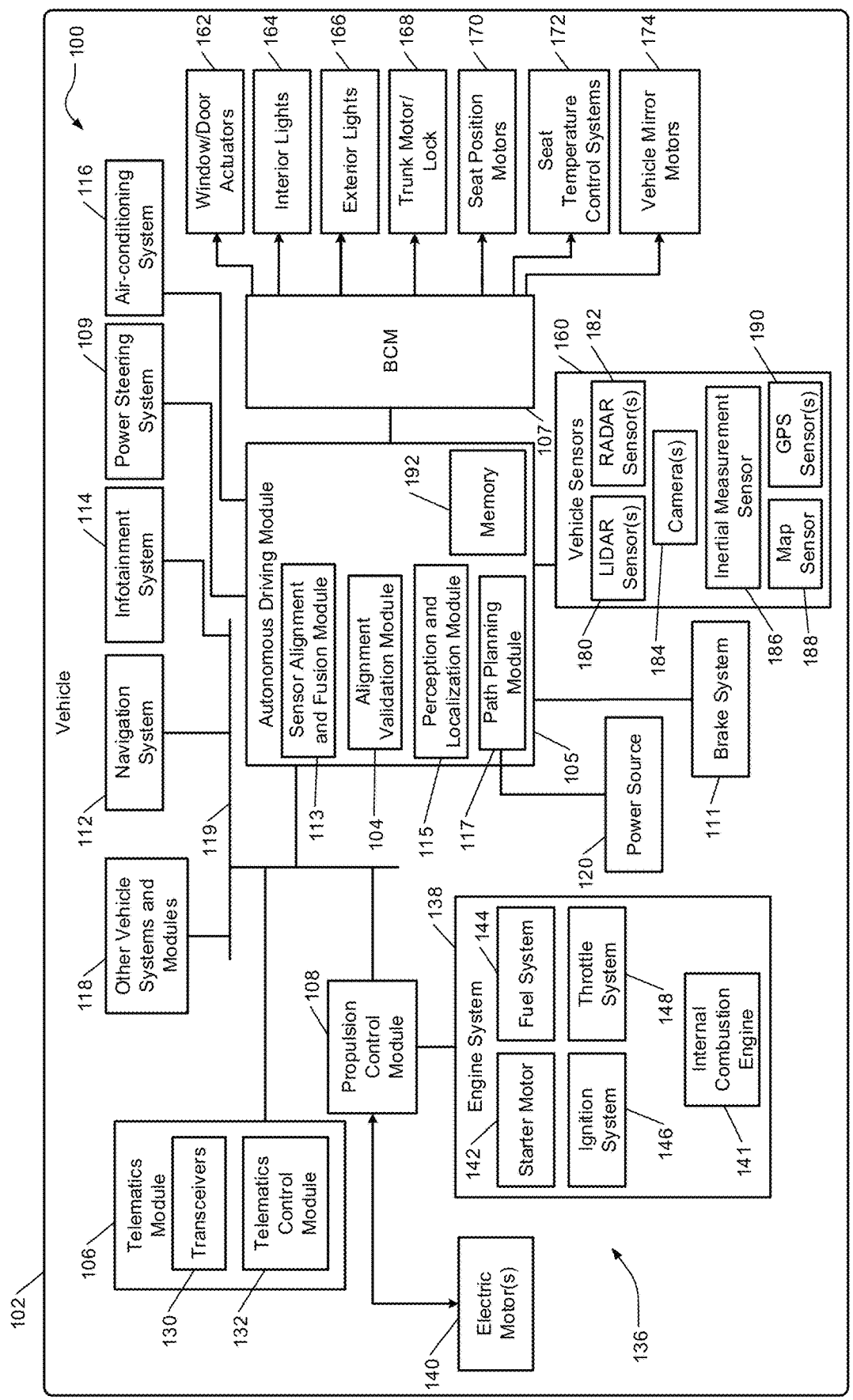
FIG. 1 is a functional block diagram of an example vehicle system including a validation alignment module in accordance with the present disclosure.

An autonomous driving module may perform sensor alignment and fusion operations, perception and localization operations, and path planning and vehicle control operations. The stated operations may be performed based on data collected from various sensors, such as LIDAR sensors, RADAR sensors, cameras, and an inertial measurement sensor (or inertial measurement unit) and data collected from a global positioning system (GPS). Sensor alignment and fusion may include alignment of a coordinate system of each sensor with a reference coordinate system, such as a vehicle coordinate system. Fusion may refer to the collecting and combining of the data from the various sensors.

Perception refers to the monitoring of vehicle surroundings and the detection and identification of various features and/or objects in the surroundings. This can include determining various aspects of the features and objects. The term "feature" as used herein refers to one or more detected points that can be reliably used to determine a location of an object. This is unlike other data points detected, which do not provide reliable information regarding location of an object, for example, a point on a leaf or branch of a tree. The aspects determined may include object distances, locations, sizes, shapes, orientation, trajectories, etc. This may include determining the type of object detected, for example whether the object is a traffic sign, a vehicle, a pole, a pedestrian, a ground surface, etc. Lane marking information may also be detected. A feature may refer to a surface, edge, or corner of a building. Localization refers to information determined about a host vehicle, such as location, speed, heading, etc. Path planning and vehicle control (e.g., braking, steering, and accelerating) are performed based on the gathered perception and localization information.

A vehicle may include multiple LIDAR sensors. LIDAR sensor alignment including LIDAR-to-vehicle alignment and LIDAR-to-LIDAR alignment affects accuracy of determined perception and localization information including feature and object information, such as that described above. LIDAR alignment may need to be recalibrated periodically to account for any shift in alignment caused by different driving conditions. Online validation, meaning in-vehicle validation in the runtime, is challenging since target objects are not predetermined.

The examples set forth herein include LIDAR-to-LIDAR alignment and LIDAR-to-vehicle alignment validation methods. LIDAR misalignment is detected through validation to initiate a recalibration process. The validation methods include integration of ground fitting, target detection and point cloud registration. In one embodiment, roll, pitch, and yaw differences between LIDAR sensors are determined based on targets (e.g., ground, traffic sign, light pole, etc.). In a same or alternative embodiment, rotation and translation differences of LIDAR sensors are determined based differences in point cloud registrations of the LIDAR sensors. The validation methods include (i) a first method for determining a first six parameter vector of differences between LIDAR sensors in pitch, roll, yaw, x, y, z values are determined, and/or (ii) a second method for determining a second six parameter vector of pitch, roll, yaw, x, y, z values are determined. The first method is based on selection of certain objects for determining roll, pitch and yaw. The second method is based on determining rotation and translation differences from point clouds of LIDAR sensors. The results of the methods may be weighted and aggregated to provide a resultant six parameter vector based on which a determination of alignment is made.

FIG. 1 shows an example vehicle system 100 of a vehicle 102 including an alignment validation module 104 for LIDAR-to-LIDAR and LIDAR-to-vehicle alignment. Operations performed by the alignment validation module 104 are further described below with respect to at least FIGS. 2-8.

The vehicle system 100 may include an autonomous driving module 105, a body control module (BCM) 107, a telematics module 106, a propulsion control module 108, a power steering system 109, a brake system 111, a navigation system 112, an infotainment system 114, an air-conditioning system 116, and other vehicle systems and modules 118. The autonomous driving module 105 may include the alignment validation module 104 and may also include a sensor alignment and fusion module 113, a perception and local-ization module 115, and a path planning module 117. Operations of these modules are further described below.

The modules and systems 104-108, 112-115 and 118 may communicate with each other via a controller area network (CAN) bus, a Ethernet network, a local interconnect network (LIN) bus, another bus or communication network and/or wirelessly. Item 119 may refer to and/or include a CAN bus, an Ethernet network, a LIN bus and/or other bus and/or communication network. This communication may include other systems, such as systems 109, 111, 116. A power source 120 may be included and power the autonomous driving module 105 and other systems, modules, devices and/or components. The power source 120 may include an accessory power module, one or more batteries, generators and/or other power sources.

The telematics module 106 may include transceivers 130 and a telematics control module 132. The propulsion control module 108 may control operation of a propulsion system 136 that may include an engine system 138 and/or one or more electric motor(s) 140. The engine system 138 may include an internal combustion engine 141, a starter motor 142 (or starter), a fuel system 144, an ignition system 146, and a throttle system 148.

The autonomous driving module 105 may control the modules and systems 106, 108, 109, 111, 112, 114, 116, 118 and other devices and systems based on data from sensors 160. The other devices and systems may include window and door actuators 162, interior lights, 164, exterior lights 166, trunk motor and lock 168, seat position motors 170, seat temperature control systems 172, and vehicle mirror motors 174. The sensors 160 may include temperature sensors, pressure sensors, flow rate sensors, position sensors, etc. The sensors 160 may include LIDAR sensors 180, RADAR sensors 182, cameras 184, inertial measurement sensor 186, a Map sensor 188, a GPS system 190, and/or other environment and feature detection sensors and/or systems. The GPS system 190 may be implemented as part of the navigation system 112.

Figure 2:
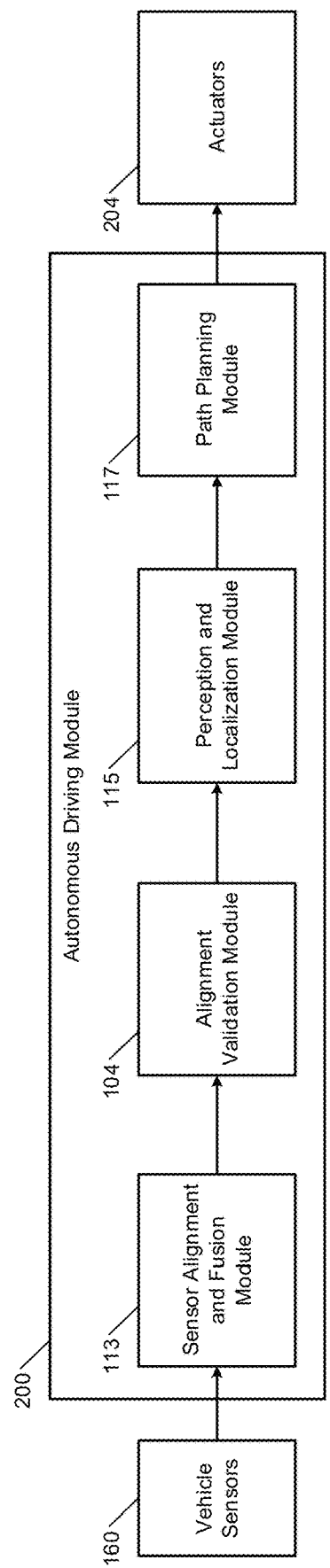
FIG. 2 is a functional block diagram of an example autonomous driving module operating based on LIDAR sensor alignment performed by the validation alignment module in accordance with the present disclosure.

FIG. 2 shows an example autonomous driving module 200 operating based on LIDAR sensor alignment performed by the alignment validation module 104. The autonomous driving module 200 may replace one or more of the autonomous driving module 105 of FIG. 1 and may include the sensor alignment and fusion module 113, the alignment validation module 104, the perception and localization module 115, and the path planning module 117.

The sensor alignment and fusion module 113 may perform sensor alignment and fusion operations, as described above, based on outputs of the sensors 160 (e.g., the sensors 180, 182, 184, 186, 188, 190). The alignment validation module 104 determines whether LIDAR sensors are aligned, meaning differences in information provided by the LIDAR sensors for the same one or more features and/or objects are within predetermined ranges of each other. The alignment validation module 104 determines difference values for six degrees of freedom of the LIDAR sensors including roll, pitch, yaw, x, y, and z difference values and based on this information determines whether the LIDAR sensors are aligned. If not aligned, one or more of the LIDAR sensors may be recalibrated. In one embodiment, when one of the LIDAR sensors is determined to be misaligned, the misaligned LIDAR sensor is recalibrated. In another embodiment, when one of the LIDAR sensors is determined to be misaligned, two or more LIDAR sensors including the misaligned LIDAR sensor are recalibrated. In another embodiment, the misaligned LIDAR sensor is isolated and no longer used and an indication signal is generated indicating service is needed for the LIDAR sensor. Data from the misaligned sensor may be discarded. Additional data may be collected after recalibration and/or service of the misaligned LIDAR sensor.

After validation, the perception and localization module 115 may perform perception and localization operations based on the collected and aggregated sensor data to determine aspects of an environment surrounding a corresponding host vehicle (e.g., the vehicle 102 of FIG. 1). This may include generating perception and localization information as stated above. This may include detection and identification of features and objects and determining locations, distances, and trajectories of the features and objects relative to the host vehicle. The path planning module 117 may determine a path for the vehicle based on an output of the perception and localization module 115. The path planning module 117 may control operations of the vehicle based on the determined path including controlling operations of the power steering system, the propulsion control module, and the brake system via actuators 204. The actuators 204 may include motors, drivers, valves, switches, etc.

The autonomous driving module 105 may include memory 192, which may store sensor data, historical data, and other data and information referred to herein.

Figure 3:
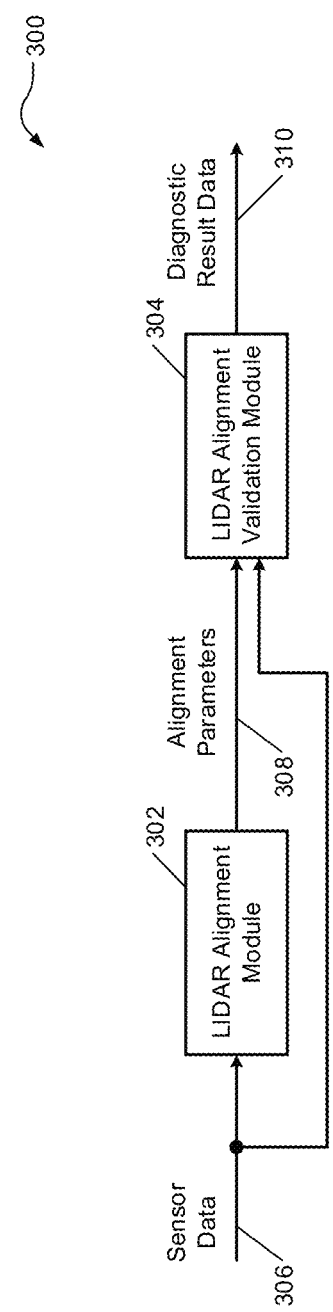
FIG. 3 is a functional block diagram of an example of an alignment system including a LIDAR alignment module and a LIDAR alignment validation module in accordance with the present disclosure.

FIG. 3 shows an alignment system 300 including a LIDAR alignment module 302 and a LIDAR alignment validation module 304. The alignment system 300 may represent portions of the sensor alignment and fusion module 113 and the alignment validation module 104 of FIGS. 1-2 with respect to operations performed in relationship with the LIDAR sensors 180. The LIDAR alignment module 302 may collect outputs of sensors and/or saved sensor data, such as data collected from and/or generated based on outputs of the LIDAR sensors 180, the inertial measurement sensor 182, and the GPS system 190. Sensor data 306 is shown.

The LIDAR alignment module 302 may measure outputs of the LIDAR sensors independently using respective coordinate systems, one for each LIDAR sensor. Each LIDAR sensor generates a point cloud of data, where each point includes x, y, and z coordinates. The x coordinate may refer to a lateral horizontal direction. The y coordinate may refer to a fore and aft or longitudinal direction, and the z direction may refer to a vertical direction. In other coordinate systems x, y and z may be defined differently. Each of the LIDAR sensors may be mounted in a respective location on a vehicle and have a respective orientation. Since the LIDAR sensors are in different locations and may be in different orientations, the LIDAR sensors may report different values for a same detected object. The LIDAR alignment module 302 performs a LIDAR-to-vehicle transform for each LIDAR sensor and provides six alignment parameters 308 for one or more LIDAR sensors that represent roll, pitch, yaw, x, y and z transform values. The parameters may be represented as a matrix (e.g., a 4×4 matrix).

The LIDAR alignment validation module 304 receives the output of the LIDAR alignment module 302, which may include the six parameters values for each LIDAR sensor and/or the representative matrix of values. Based on the received values, the LIDAR alignment validation module 304 performs online validation of LIDAR-to-LIDAR alignment and provides diagnostic result data 310 indicating whether the alignment satisfied certain conditions. Online validation refers to the validation be performed within the vehicle in the runtime, as opposed to being performed at a back (or central) office or in the vehicle at a later time (referred to as offline). This may be performed for partially or fully autonomous vehicles. The difference between online and offline is mainly associated with the runtime. If the validation is performed during the vehicle's regular driving task, it's considered as online. Thus, an online validation may be performed at a back office, as long as it's during the runtime. A vehicle may perform a validation process outside its regular driving task, such as at a dealership where the vehicle is being serviced. In this case, it's considered offline, even if the validation is performed in the vehicle.

The validation of LIDAR-to-LIDAR alignment includes: monitoring for an enabling condition to initiate the online validation process, which is based on vehicle dynamics and localization and perception results; aggregation of LIDAR point clouds to a vehicle coordinate system; determining pitch, roll and yaw differences; determining rotation and translation differences; and/or making decisions based on integration of results from multiple different methods performs. The aggregation of LIDAR point clouds may include, when the corresponding host vehicle is in a static state (i.e. not moving), using a LIDAR-to-vehicle transform to map each point into the vehicle coordinate system. As an example, the vehicle coordinate system may have a center of gravity or other point on the vehicle as a reference point. The aggregation of LIDAR point clouds may also include, when the host vehicle is in a dynamic state (i.e. moving), first use point registration to aggregate multiple LIDAR frames followed by applying a LIDAR-to-vehicle transform.

Determining pitch and roll differences may be performed using a first method and based on data received from two LIDAR sensors. The pitch and roll difference may be determined based on ground fitting and selection, as described below. The first method may include use of a space filter, slope-based algorithms, morphological transformations, etc. The space filter uses a 3-dimensional (3D) region in space to pick points within the region. For example, the space filter may be defined as having ranges x, y, z: $x \in [\vartheta_1, \vartheta_2]$, $y \in [\vartheta_3, \vartheta_4]$, $z \in [\vartheta_5, \vartheta_6]$, where $\vartheta_1$, $\vartheta_2$, $\vartheta_3$, $\vartheta_4$, $\vartheta_5$, $\vartheta_6$ are predetermined values (or thresholds). If a point's (x, y, z) satisfies a predetermined condition of being within the region, it is selected by the space filter. The slope-based algorithms detect points on the ground (e.g., earth ground or road surface) by checking whether the slope between a point and neighboring points satisfy a predetermined condition (e.g., the slope being less than a predetermined threshold). Morphological transformations refer to a theory and technique for the analysis and processing of geometrical structures. The theory and technique may be based on set theory, lattice theory, topology, and random functions.

The determining of yaw differences between two LIDARs may be based on target detection and may include use of a space filter, an intensity filter, clustering, and/or point cloud registration. The intensity filter may include an intensity range defined to select points with intensity values that are in the intensity range. For example, the intensity filter may be defined as $i > \vartheta_7$, where i is intensity and $\vartheta_7$ is a predetermined threshold. Clustering is a task of grouping a set of objects in such a way that the objects in the same group (referred to as a cluster) are more similar (in some sense) to each other than to those in other groups (clusters). Point cloud registration is the process of finding a spatial transformation (e.g., scaling, rotation and translation) that aligns two point clouds.

The determining of rotation and translation differences between two LIDAR sensors based on point cloud registration such as iterative closest point (ICP), generalized ICP, normal-distributions transform (NDT), etc. ICP is an algorithm used to minimize a difference between two point clouds. ICP may include computing correspondences between two scans and computing a transformation, which minimizes distance between corresponding points. Generalized ICP is similar to ICP and may include attaching a probabilistic model to a minimization operation of ICP. NDT is a representation for a range scan, which may be used when matching 2D range scans. Similar to an occupancy grid, a 2D plane is subdivided into cells. To each cell, a normal distribution is assigned, which locally models the probability of measuring a point. The result of the transform is a piecewise continuous and differentiable probability density, that can be used to match another scan using Newton's algorithm.

Figure 4:
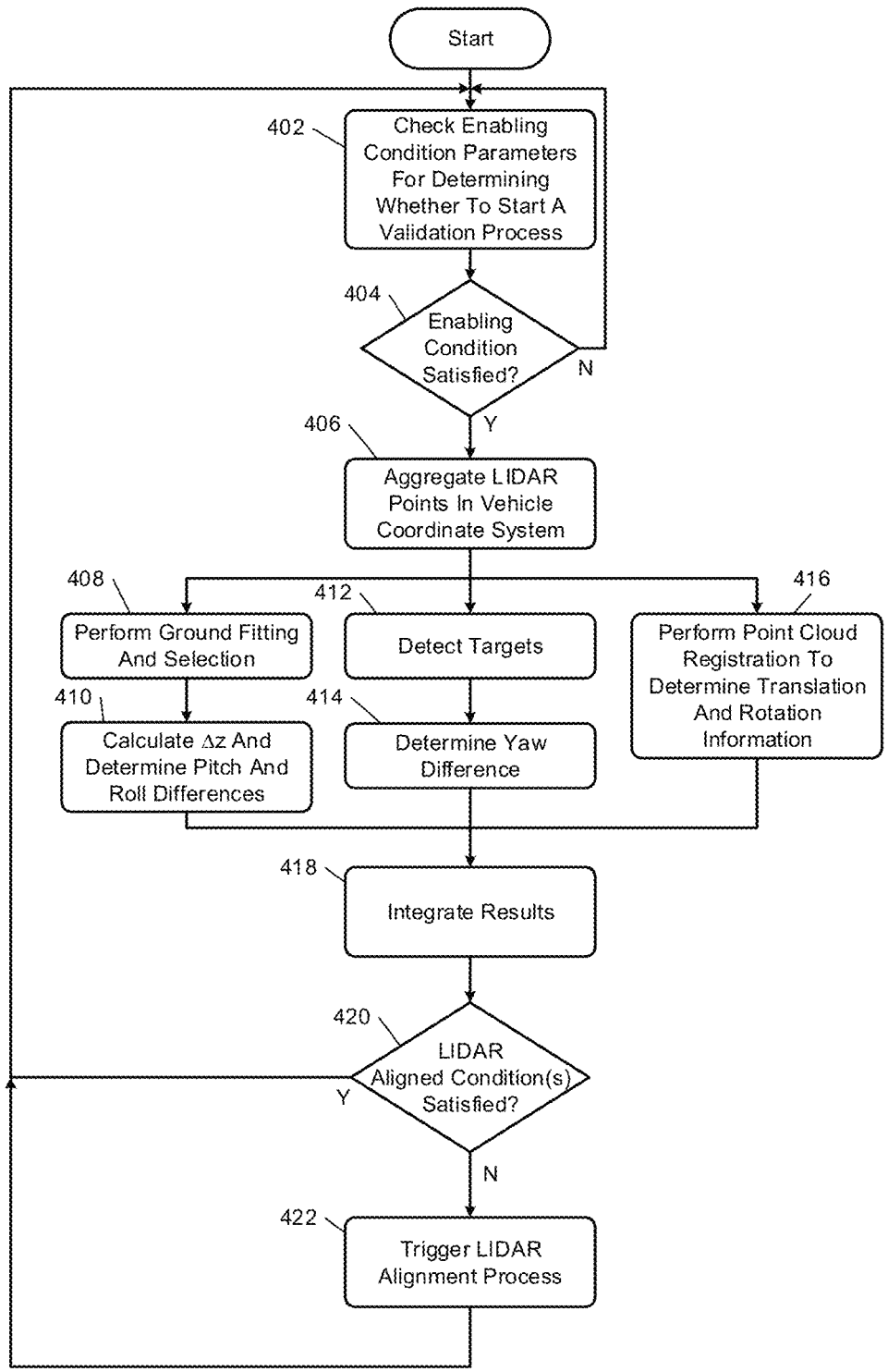
FIG. 4 illustrates an example method of validating LIDAR sensor alignments in accordance with the present disclosure.

The modules 302, 304 may perform LIDAR-to-LIDAR alignment and validation, which includes transforming point data of one LIDAR sensor to a coordinate system of another LIDAR sensor and validating the transform. This may be performed in addition to LIDAR-to-vehicle alignment for redundancy purposes and verification purposes and to account for errors in performing these transformations. LIDAR-to-vehicle transformation may be performed for data sets from each LIDAR sensor. In general, if the differences in the transformations between LIDAR-to-LIDAR and LIDAR-to-vehicle is small (e.g., below predetermined threshold values), then the LIDAR sensors are aligned. If not, then one or more of the LIDAR sensors may need to be recalibrated and/or serviced. Results of performing a LIDAR-to-LIDAR transform, may be used to infer a LIDAR-to-vehicle transform. A LIDAR-to-LIDAR transform may be calculated using two LIDAR-to-vehicle transforms. A verification that a LIDAR-to-LIDAR transform is accurate infers that each of the LIDAR-to-vehicle transforms are accurate. At least two LIDAR sensors are used when validating a LIDAR-to-LIDAR transform and/or LIDAR-to-vehicle transforms Alignment Validation FIG. 4 shows an example method of validating LIDAR sensor alignments, which may be iteratively performed. The method may be performed by the alignment validation modules 104, 304 of FIGS. 1-3. The method may begin at 402, which includes checking enabling condition parameters to determine whether to start a validation process. The enabling conditions are associated with vehicle dynamics, vehicle location, detection and location of surrounding objects, etc.

Check Enabling Conditions

At 404, the alignment validation module determines whether the enabling conditions are satisfied. If yes, operation 406 is performed. Operations 402, 404 may include the operations described with respect to the method of FIG. 5.

Figure 5:
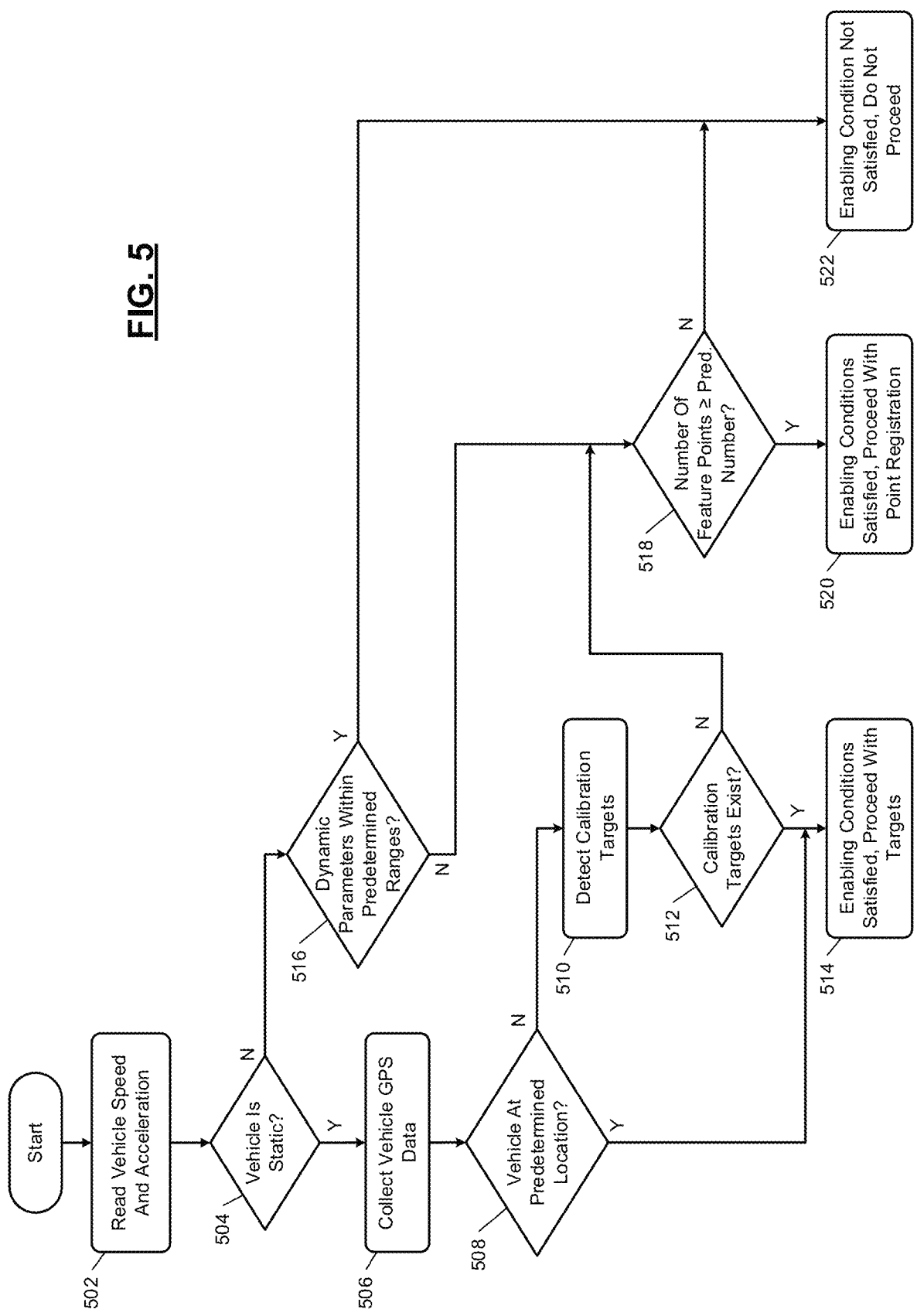
FIG. 5 illustrates an example enabling condition checking method in accordance with the present disclosure.
Figure 6:
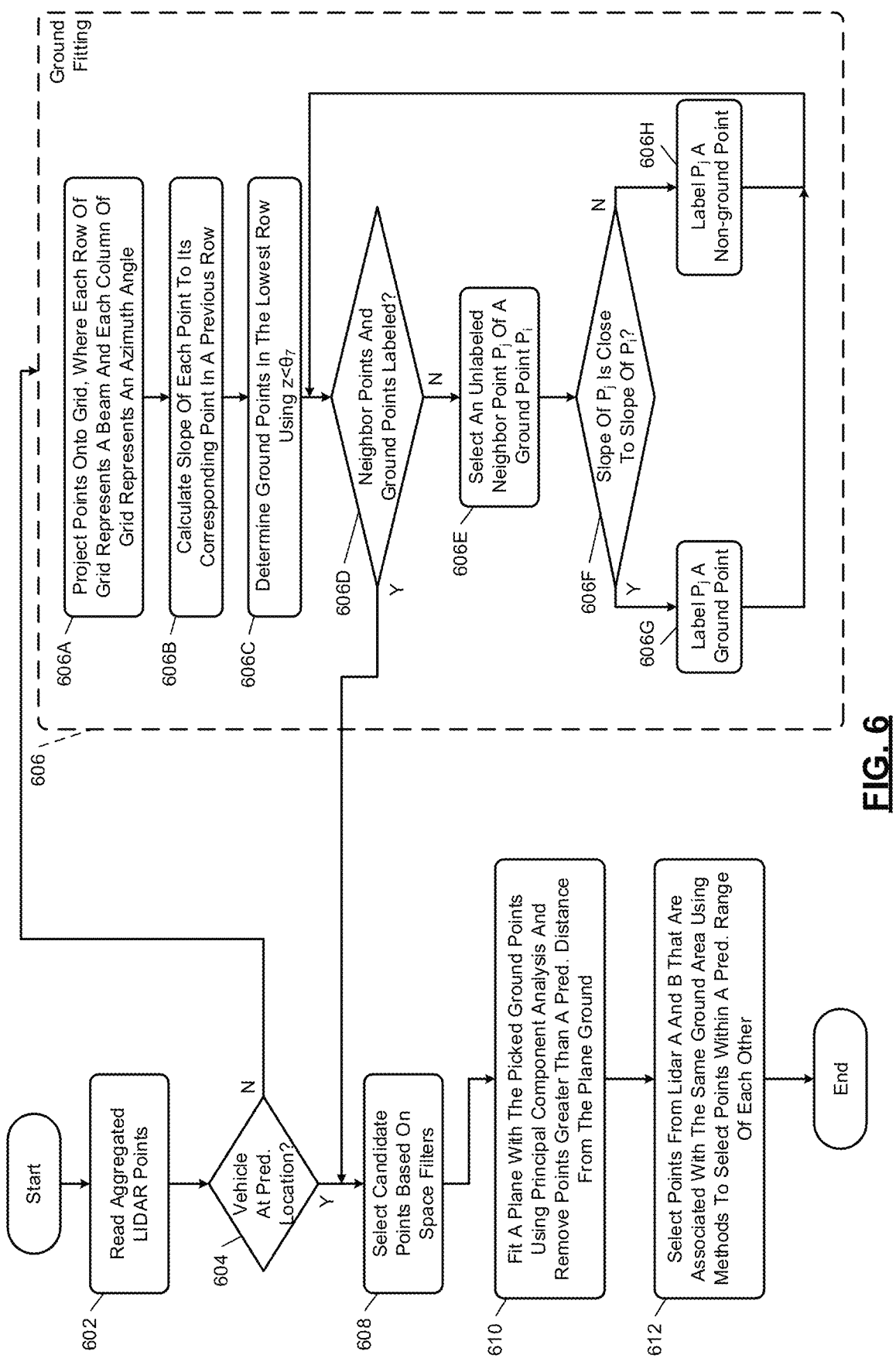
FIG. 6 illustrates an example ground fitting and selection method in accordance with the present disclosure.

The method of FIG. 5 may begin at 502, which includes measuring, reading and/or determining vehicle speed and acceleration. At 504, the alignment validation module determines whether the vehicle is not moving (or static). If yes operation 506 is performed, otherwise operation 516 is performed.

At 506, the alignment validation module collects vehicle GPS data. At 508, the alignment validation module, based on the vehicle GPS data, determines whether the vehicle is at a predetermined location. If yes, operation 514 is performed, otherwise operation 510 is performed. At 510, the alignment validation module detects calibration targets. This may include using perception operations and/or performing the method of FIG. 6 target detection, which are further described below with respect to operations 408 and 412.

At 512, the alignment validation module determines whether calibration targets exist. If yes, operation 514 is performed, otherwise operation 518 is performed. At 514, the alignment validation module determines that the enabling conditions are satisfied and proceeds with targets to operation 408.

At 516, the alignment validation module determines whether dynamic parameters are within predetermined ranges. Dynamic parameters may include vehicle velocity, acceleration, and yaw rate conditions. As an example, when the acceleration, velocity, and yaw rate are greater than certain predefined thresholds, respectively. If not within the predetermined ranges, operation 518 is performed, otherwise operation 522 is performed.

At 518, the alignment validation module determines whether a number of feature points is greater than or equal to a predetermined number. If yes, operation 520 is performed, otherwise operation 522 is performed. At 520, the alignment validation module determines that the enabling conditions are satisfied and proceeds with point registration to operation 408. At 522, the alignment validation module determines that the enabling conditions are not satisfied and does not proceed. The method of FIG. 4 may end subsequent to operation 522.

Lidar Point Aggregation

Referring again to FIG. 4, at 406, the alignment validation module aggregates LIDAR points in the vehicle coordinate system. Operation 406 may include a static aggregation, performed for points collected when the vehicle is not moving, and may additionally include a dynamic aggregation, performed for points collected when the vehicle is moving. The static aggregation includes performing a LIDAR-to-vehicle transform for each LIDAR sensor. As an example, two LIDAR sensors A and B may be used. Points from LIDAR A, represented as $\{P_i^A\}$, and LIDAR A calibration values for rotation $R_A$ and translation $t_A$ are used to aggregate and/or map points from LIDAR A to the vehicle coordinate system. The resulting points are represented as $\{P_i^{VA}\}$. This may be done using equation 1, where i is the point number.

$$\{P_i^{VA}\}=R_A P_i^A + t_A \quad (1)$$

Points from LIDAR B, represented as $\{P_i^B\}$, and LIDAR B calibration values for rotation $R_B$ and translation $t_B$ are used to aggregate and/or map points from LIDAR B to the vehicle coordinate system. The resulting points are represented as $\{P_i^{VB}\}$. This may be done using equation 2. In this example, LIDAR-to-LIDAR is not compared directly, but rather indirectly through LIDAR-to-vehicle transforms.

$$\{P_i^{VB}\}=R_B P_i^B + t_B \quad (2)$$

The dynamic aggregation includes taking points of each of the LIDAR A and B, represented as LIDAR j, where j is A or B, at time k: $\{P_{i,k}^j\}$ and performing point registration. Point registration is performed to map the points at time k' in the coordinate system of LIDAR j at time k. This may be done using equation 3, such that $\{P_{i,k}^j\}$ and $\{\hat{P}_{i,k'}^j\}$ are overlapping.

$$\hat{P}_{i,k'}^j = R_{j,k',k} P_{i,k'}^j + t_{j,k',k} \quad (3)$$

Registration methods that are performed may include ICP, generalized ICP, edge and surface feature points registration, NDT, etc. The mapped points are then aggregated for LIDAR j (A or B) using equation 4.

$$\{P_i^j\} = U_k\{\hat{P}_{i,k}^j\} \quad (4)$$

Then, the $\{P_i^A\}$ and $\{P_i^B\}$ values generated by performing the LIDAR registration are used as inputs to perform the aggregation same as the static aggregation and put into equations 1 and 2, respectively, to provide the resulting aggregated and mapped points $\{P_i^{VA}\}$, $\{P_i^{VB}\}$. The aggregated and mapped points $\{P_i^{VA}\}$, $\{P_i^{VB}\}$ may be provided as inputs for operations 408, 412 and 416.

Since two LIDAR sensors detect one location differently, even when mapped to same coordinate system, pitch and roll differences, yaw differences, rotation differences, and/or translation differences may be determined. These differences are determined in following operations 410, 414, 416. To determine pitch and roll differences, two respective ground locations, one on a side of the vehicle and one forward of the vehicle may be selected. A vertical height difference in detecting the ground location on the side of the vehicle may be used to determine the roll difference. A vertical height difference in detecting the ground location forward of the vehicle may be used to determine the pitch difference. For a yaw difference, an object that extends vertically (e.g., a light pole) may be selected. A horizontal difference in detecting the location of the object may be used to determine the yaw difference.

Ground Fitting and Selection

At 408, the alignment validation module performs ground fitting and selection. Operations 408, 410 may be referred to as a pitch and roll difference method. Operation 408 may include the operations of FIG. 6, which may begin at 602. At 602, the alignment validation module reads aggregated LIDAR points from memory and as determined above. At 604, the alignment validation module determines whether the vehicle is at a predetermined known location. If no, operation 606 is performed, otherwise operation 608 is performed.

At 606, ground fitting is performed. At 606A, the alignment validation module projects points onto a grid, were each row of the grid represents a beam and each column of the grid represents an azimuth angle. At 606B, the alignment validation module calculates a slope of each point relative to its corresponding point in a previous row. At 606C, the alignment validation module determines ground points in the lowest row of the grid (or frame) using $z < \theta$, where $\theta$ is a predetermined threshold. When the z value of the point is less than the predetermined threshold, then the point is a ground point in the lowest row.

At 606D, the alignment validation module determines whether the neighbor points and the ground points are labeled. If yes, operation 608 may be performed, otherwise operation 606E may be performed. At 606E, the alignment validation module selects an unlabeled point $P_j$ of a ground point $P_i$. At 606F, the alignment validation module determines whether the slope of $P_j$ us close to slope of $P_i$. If yes, operation 606G is performed, otherwise operation 606H is performed. At 606G, the alignment validation module labels $P_j$ as a ground point. At 606H, the alignment validation module labels $P_j$ as a non-ground point. Subsequent to operations 606G and 606H, operation 606D is performed.

At 608, the alignment validation module selects candidate points based on space filters, where $x \in [\theta_1, \theta_2]$, $y \in [\theta_3, \theta_4]$, $z \in [\theta_5, \theta_6]$. $\theta_i$ may have different values for pitch and roll, respectively. At 610, the alignment validation module fits a plane with the selected ground points using principal component analysis and removes points greater than a predetermined distance from the plane ground.

At 612, the alignment validation module selects points from LIDAR A and B that are associated with the same ground area using methods to select points within a predetermined range of each other. The methods may include using a k-d tree, which is a binary tree, where every leaf node is a k-dimensional point. The k-d tree may be used to select points close in distance.

Δz and Pitch and Roll Differences

Referring again to the method of FIG. 4, at 410, the alignment validation module calculates a difference in z (or Δz) between output data points (referred to simply as "points") of the LIDAR sensors and determines pitch and roll differences between the LIDAR sensors. To determine the pitch difference, ground points $\{P_{p,i}^{VA}\}$, $\{P_{p,j}^{VB}\}$ selected above are obtained. A difference in z is determined using equation 5.

$$\Delta z_p = \mathrm{mean}_z(P_{p,i}^{VA}) - \mathrm{mean}_z(P_{p,j}^{VB}) \quad (5)$$

The pitch difference is determined using equation 6.

$$\mathrm{Pitch\_diff} = \arctan\left(\frac{\Delta z_p}{\mathrm{mean}_x\{P_{p,i}^{VA}, P_{p,j}^{VB}\}}\right) \quad (6)$$

To determine the roll difference, ground points $\{P_{r,i}^{VA}\}$, $\{P_{r,i}^{VB}\}$ selected above are obtained. A difference in z is determined using equation 7.

$$\Delta z_r = \mathrm{mean}_z(P_{r,i}^{VA}) - \mathrm{mean}_z(P_{r,j}^{VB}) \quad (7)$$

The roll difference is determined using equation 8.

$$\mathrm{Roll\_diff} = \arctan\left(\frac{\Delta z_r}{\mathrm{mean}_y\{P_{r,i}^{VA}, P_{r,j}^{VB}\}}\right) \quad (8)$$

Target Detection

At 412, the alignment validation module detects targets (e.g., features and/or objects). A target may refer small objects, which are able to be fully detected, unlike large buildings. Target points are features points, but not all feature points are target points. Target detection may be implemented using: a space filter, where $x \in [\theta_8, \theta_9]$, $y \in [\theta_{10}, \theta_{11}]$, $z \in [\theta_{12}, \theta_{13}]$, distance $\in [\theta_{14}, \theta_{15}]$; an intensity filter and clustering; and point cloud registration. The space filter may be used if the location of the vehicle is known (e.g., a parking lot with known objects, such as light poles in know locations). If the location of the vehicle is not known, then the intensity filter and clustering may be performed along with point cloud registration to pick a target and then calculate angular difference to the target. A yaw difference is then determined based on the angular difference.

Yaw Differences

Figure 7:
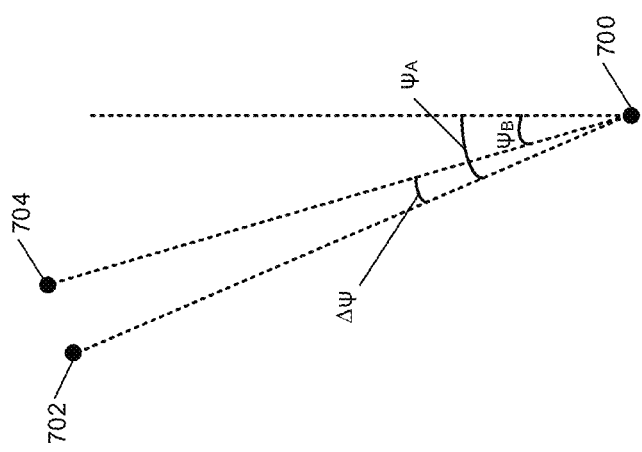
FIG. 7 is an example diagram illustrating yaw difference detection in accordance with the present disclosure.

At 414, the alignment validation module determines yaw differences between points of LIDAR sensors. Operations 412, 414 may be referred to as a yaw difference method. Yaw difference may be determined using equations 9-11, as illustrated in FIG. 7, where $\psi_A$ is an angle between a reference line and a target as seen by LIDAR A, $\psi_B$ is an angle between the reference line and the target as seen by LIDAR B, and the yaw differences is $\Delta\psi$. Point 700 refers to a reference point (e.g., center of gravity) of the vehicle. Point 702 refers to the target as seen by LIDAR A and point 704 refers to the target as seen by LIDAR B.

$$\psi_A = \arctan\left(\frac{mean_y(P_{\psi,i}^{VA})}{mean_x(P_{\psi,i}^{VA})}\right) \quad (9)$$

$$\psi_B = \arctan\left(\frac{mean_y(P_{\psi,j}^{VB})}{mean_x(P_{\psi,j}^{VB})}\right)$$

$$\text{Yaw\_diff} = \psi_A - \psi_B$$

Point Cloud Registration

At 416, the alignment validation module performs point cloud registration to determine translation and rotation information. Operation 416 may be referred to as a point cloud difference method and includes determining rotation and translation differences. Using the aggregated points from LIDAR A and B, or $\{P_i^{VA}\}, \{P_i^{VB}\}$, the alignment validation module performs point cloud registration including determining a transform $T_{B-A}$, such that equation 12 is satisfied, where $\{P_i^{VB-A}\}$ is aligned with $\{P_i^{VA}\}$.

$$P_i^{VB-A} = T_{B-A} P_i^{VB} \quad (12)$$

The alignment validation module converts the transform $T_{B-A}$ into rotation angles and translation values, which are roll difference, pitch difference, yaw difference, x difference, y difference, and z difference values. The above stated technique includes moving a first point cloud to overlap a second point cloud and determining how much the first point cloud was moved, represented by rotation and translation values. In an embodiment, the first point cloud is moved to be as close as possible to perfectly overlapping and matching the second point cloud. The rotation and translation values are then converted to the six degrees of freedom. Pitch, roll, yaw, x, y, z errors may be calculated and indicate the extent of misalignment between the LIDAR sensors.

From operations 410, 414 and 416 two sets of six degrees of freedom values are determined for the LIDAR sensors. The first set is from operations 410 and 414 and the second set is from operation 416.

Integrate Results and Final Decisions

At 418, the alignment validation module integrates results operations 410, 414 and 416 of the pitch and roll difference method, the yaw difference method and the point cloud difference method. Operation 418 may include using results from the first method (or operations 408, 410, 412, 414) and/or results from the second method (operation 416). A first vector of six difference values may be obtained from combining results of operations 410, 414. A second vector of six difference values may be obtained from performing operation 416. The number of the method is indicated as variable i. A vector $\Delta a_i$ of the six parameter differences is represented by equation 13. A similar vector may be determined for each of the methods performed.

$$\Delta a_i = [\text{roll\_diff}_i, \text{pitch\_diff}_i, \text{yaw\_diff}_i, x\_diff_i, y\_diff_i, z\_diff_i] \quad (13)$$

Integrated results of the methods may be determined using equation 14, where $w_i$ are the calibrated weights applied to each of the vectors. A same weight may be applied to each value of a vector, where a different weight is applied to each vector. Alternatively, a different weight may be applied to each difference value of each vector.

$$\Delta a = \frac{\sum w_i \Delta a_i}{\sum w_i} \quad (14)$$

At 420, the alignment validation module performs final decisions, such as determining whether alignment conditions are satisfied. If the conditions are satisfied, then the LIDAR sensors are aligned. If values of a resulting vector $\Delta a$ are greater than predetermined threshold values of a predetermined vector, then the alignment validation is deemed to have failed. The predetermined vector may include six thresholds corresponding to the six different parameters. When one or more of the thresholds is exceeded, then the alignment validation may be deemed to have failed. One or more of the LIDAR sensors may then be recalibrated and/or serviced and/or replaced to provide new calibration values and the above process may be repeated with the new calibration values. As an example, when one or more of the roll, pitch and yaw difference values are greater than or equal to 0.3°, then a condition is not satisfied and one or more of the LIDAR sensors may be recalibrated. As another example, when the x, y, z difference values are greater than or equal to 5.0 centimeters (cm), then a condition is not satisfied and one or more of the LIDAR sensors may be recalibrated. If the resulting values of vector $\Delta a$ are less than or equal to the values of the predetermined threshold vector, then the alignment validation is deemed to have passed.

When there are more than two LIDARs, a vector $\Delta a$ may be determined for each pair of LIDAR sensors. If $\Delta a$ is greater than the vector of predetermined threshold values, then one or more of the LIDAR sensors of the pair being evaluated may be identified as suspicious. The suspicious LIDARs may be recalibrated or the intersection set of suspicious LIDARS may be calibrated. For example, if a difference value between LIDAR sensors A and B is large, a difference value between LIDAR sensors A and C is large, and a difference value between LIDAR sensors B and C is small, then LIDAR sensor A may be recalibrated and LIDAR sensors B and C may not be recalibrated.

In one embodiment, alignment results for a first LIDAR sensor-to-vehicle transform and alignment results for a second LIDAR sensor-to-vehicle transform are provided. Based on these results, six degrees of freedom difference values are determined for the two LIDAR sensors.

In another embodiment, when it is know that alignment results of a first LIDAR sensor are accurate and results from a first LIDAR sensor-to-vehicle transform (or alignment) is known, then it may be determined whether a second LIDAR-to-vehicle transform (or alignment) is accurate. The first LIDAR-to-vehicle transform (or alignment) may provide a first six difference values and the first LIDAR-to-second LIDAR transform (or alignment) may provide second six values. To obtain the accurate values (or ground truth) of the six values of the second LIDAR-to-vehicle transform (or alignment), the first six difference values may be added to the second six difference values. The difference between this ground truth of the six values of the second LIDAR-to-vehicle transform (or alignment) and the existing calibration result of the second LIDAR-to-vehicle transform (or alignment) is generated in terms of the six difference values. The resultant six difference values may then be compared to the six thresholds to determine whether the second LIDAR-to-vehicle transform (or alignment) is accurate.

If the alignment validation is deemed to have failed, operation 422 may be performed, otherwise operation 402 may be performed. At 422, the alignment validation module may trigger a LIDAR alignment process to recalibrate the identified LIDAR sensors that have been identified as not passing the alignment validation process. The suspicious LIDAR sensors may not be used and/or relied upon until recalibrated and/or serviced.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The following Table 1 indicates advantages of performing operations 408, 410, 412, 414 (method 1), operation 416 (method 2), and operation 418.

TABLE 1

Advantages of Performing Some Operations of FIG. 4.

| Comparison | Target Based | Point Registration Based | Integration of Both Methods |
|---|---|---|---|
| Capable of Validating Orientation Difference | Yes | Yes | Yes |
| Capable of Validating Translation Difference | No | Yes | Yes |
| Capable of Applying to a Random Location | No | Yes | Yes |
| Capable of Applying During Dynamic State | No | Yes | Yes |
| Computational Resource | Low | High | High |
| Variance | High | Low | Low |

In an embodiment, the above-described examples include dynamic LIDAR-to-vehicle validation. Dynamic LIDAR-to-vehicle validation includes point registration in a dynamic state, motion distortion removal for LIDAR data and inertial navigation system (INS) error compensation. The examples may include making comparisons to references including providing LIDAR alignment results and determining references, such as a ground-truth, history results, and fleet statistics. A "ground-truth" refers to points and/or information that are known to be correct, which may then be used as a reference based on which are information is generated and/or decisions are made.

Figure 8:
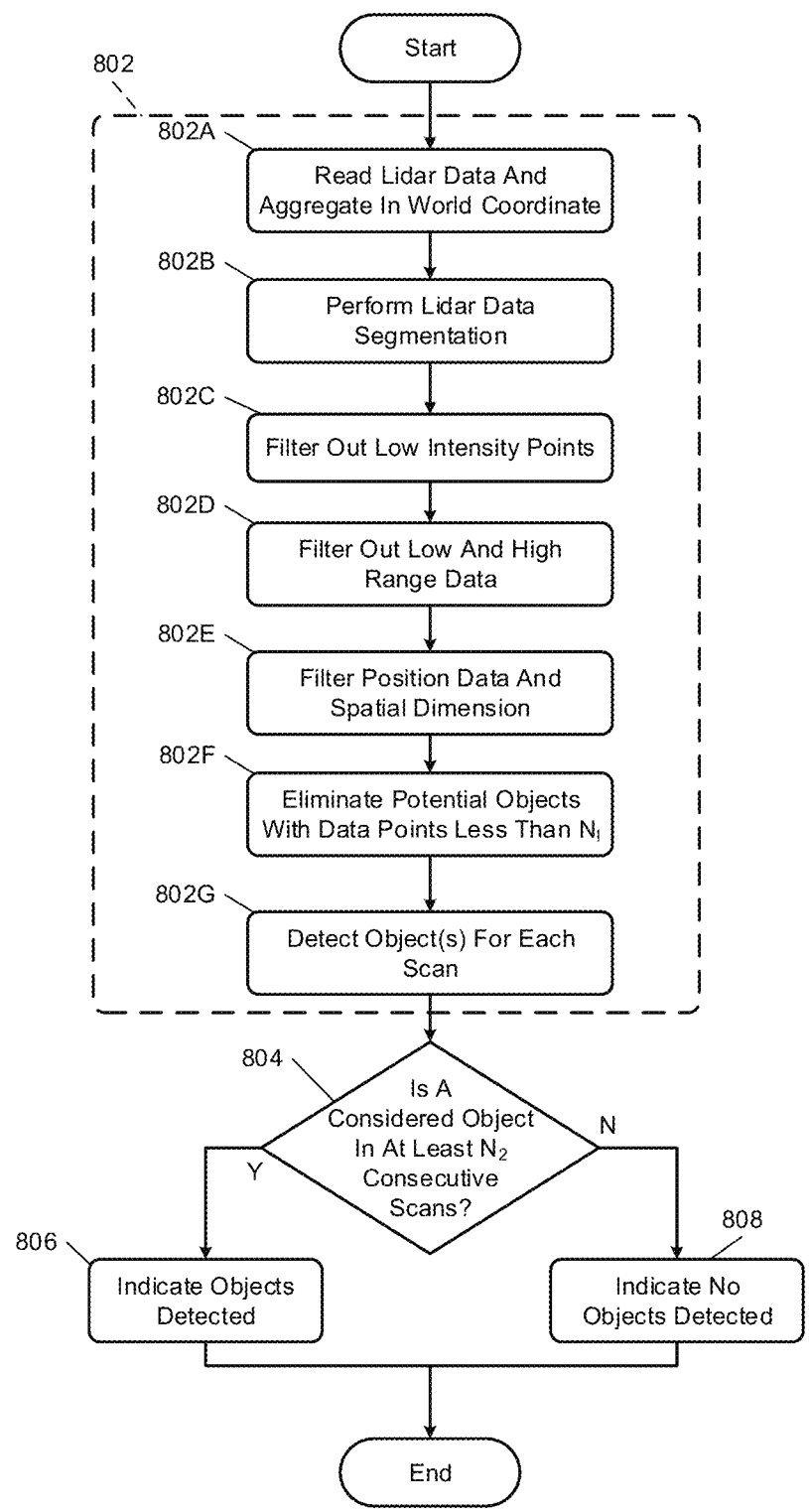
FIG. 8 is an example object detection method.

FIG. 8 shows an object detection method, which may be integrated into the above-described methods to detect objects. The method may begin at 802 where the autonomous driving module 105 of FIG. 1, for each type of object being considered, loops through each scan of data collected using a LIDAR sensor.

At 802A, the autonomous driving module 105 reads data collected via LIDAR sensors and aggregates the data in a world coordinate system. At 802B, the autonomous driving module 105 performs LIDAR data segmentation. At 802C, the autonomous driving module 105 filters out low intensity points or points have intensity levels less than a predetermined threshold (e.g., T1).

At 802D, the autonomous driving module 105 filters out low and high range (distance) data or data outside a predetermined range T2-T3. At 802E, the autonomous driving module 105 filters data position (mean shift clustering) and spatial dimension (ranges in x, y, z).

At 802F, the autonomous driving module 105 eliminates potential objects with data points less than N1, where N1 is a predetermined threshold number of points. At 802G, the autonomous driving module 105 detects object(s) for each scan.

At 804, the autonomous driving module 105 determines if there is a considered object in at least N2 consecutive scans, where N2 is a predetermined threshold number of scans. If yes, operation 806 is performed, otherwise operation 808 is performed. At 806, the autonomous driving module 105 indicates that objects are detected. At 808, the autonomous driving module 105 indicates that objects are not detected.

The values T1, T2, T3, N1, N2 and the ranges in x, y, z are calibratable and may be specific to each object considered. Objects with true known locations may also be detected, for example, using high-definition maps, vehicle-to-vehicle communication, and/or vehicle-to-infrastructure communication.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A LIDAR-to-LIDAR alignment system comprising:
a memory configured to store (i) first points of data provided based on an output of a first LIDAR sensor, and (ii) second points of data provided based on an output of a second LIDAR sensor; and
an autonomous driving module configured to perform a validation process to determine whether alignment of the first LIDAR sensor and the second LIDAR sensor satisfy one or more alignment conditions, the validation process comprising
aggregating the first points of data and the second points of data in a vehicle coordinate system of a vehicle to provide aggregated LIDAR points, wherein the aggregating of the first points of data and the second points of data includes
performing point registration to map the first points of data at a first time in a coordinate system of the first LIDAR sensor at a second time,
aggregating the mapped first points of data from the first LIDAR sensor to provide first aggregated points,
performing point registration to map the second points of data at the first time in a coordinate system of the second LIDAR sensor at the second time, and
aggregating the mapped second points of data from the second LIDAR sensor to provide second aggregated points,
based on the aggregated LIDAR points, at least one of
performing a first method including determining pitch and roll differences between the first LIDAR sensor and the second LIDAR sensor,
performing a second method including determining a yaw difference between the first LIDAR sensor and the second LIDAR sensor, or
performing point cloud registration to determine rotation and translation differences between the first LIDAR sensor and the second LIDAR sensor, based on results of at least one of the first method, the second method or the point cloud registration, determining whether the one or more alignment conditions are satisfied, and in response to the one or more alignment conditions not being satisfied, recalibrating at least one of the first LIDAR sensor or the second LIDAR sensor.

2. The LIDAR-to-LIDAR alignment system of claim 1, wherein the autonomous driving module is further configured to:

determine whether a plurality of enabling conditions are satisfied including two or more of
determining whether the vehicle is moving,
determining whether the vehicle is in a known location,
determining whether a velocity of the vehicle is greater than a predetermined velocity,
determining whether an acceleration rate of the vehicle is greater than a predetermined acceleration rate, or
determining whether a yaw rate is greater than a predetermined yaw rate; and
in response to the plurality of enabling conditions being satisfied, aggregate the first points of data and the second points of data.

3. The LIDAR-to-LIDAR alignment system of claim 1, wherein the aggregating of the first points of data and the second points of data further includes:

mapping the first aggregated points to the vehicle coordinate system based on a rotation calibration value and a translation calibration value for the first LIDAR sensor; and
mapping the second aggregated points to the vehicle coordinate system based on a rotation calibration value and a translation calibration value for the second LIDAR sensor.

4. The LIDAR-to-LIDAR alignment system of claim 1, wherein the aggregating of the first points of data and the second points of data includes:

mapping first points of data to the vehicle coordinate system based on a rotation calibration value and a translation calibration value for the first LIDAR sensor; and
mapping the second points of data to the vehicle coordinate system based on a rotation calibration value and a translation calibration value for the second LIDAR sensor.

5. The LIDAR-to-LIDAR alignment system of claim 1, wherein the autonomous driving module is configured to:

based on aggregated LIDAR points, perform ground fitting and selecting to provide first selected points of the first LIDAR sensor in a ground area and second selected points of the second LIDAR sensor in the ground area; and
perform the first method based on the first selected points and the second selected points.

6. The LIDAR-to-LIDAR alignment system of claim 1, wherein the autonomous driving module is configured to perform the first method and, based on results of the first method, determine whether the one or more alignment conditions are satisfied.

7. The LIDAR-to-LIDAR alignment system of claim 1, wherein the autonomous driving module is configured to perform the second method, based on results of the second method, determine whether the one or more alignment conditions are satisfied.

8. The LIDAR-to-LIDAR alignment system of claim 1, wherein the autonomous driving module is configured to perform the point cloud registration and, based on results of the point cloud registration, determine whether the one or more alignment conditions are satisfied.

9. The LIDAR-to-LIDAR alignment system of claim 1, wherein the autonomous driving module is configured to perform the first method, the second method and the point cloud registration and, based on results of the first method, the second method and the point cloud registration, determine whether the one or more alignment conditions are satisfied.

10. The LIDAR-to-LIDAR alignment system of claim 1, wherein the autonomous driving module is configured to, based on alignment results of the first LIDAR sensor to the vehicle and results of the second LIDAR sensor to the vehicle, calculate six degrees of freedom difference values between the first LIDAR sensor and the second LIDAR sensor.

11. A LIDAR-to-LIDAR alignment system comprising:

a memory configured to store (i) first points of data provided based on an output of a first LIDAR sensor, and (ii) second points of data provided based on an output of a second LIDAR sensor; and
an autonomous driving module configured to perform a validation process to determine whether alignment of the first LIDAR sensor and the second LIDAR sensor satisfy one or more alignment conditions, the validation process comprising aggregating the first points of data and the second points of data in a vehicle coordinate system to provide aggregated LIDAR points,
based on the aggregated LIDAR points, at least one of
performing a first method including determining pitch and roll differences between the first LIDAR sensor and the second LIDAR sensor,
performing a second method including determining a yaw difference between the first LIDAR sensor and the second LIDAR sensor, or
performing point cloud registration to determine rotation and translation differences between the first LIDAR sensor and the second LIDAR sensor,
based on results of at least one of the first method, the second method or the point cloud registration, determining whether the one or more alignment conditions are satisfied;
in response to the one or more alignment conditions not being satisfied, recalibrating at least one of the first LIDAR sensor or the second LIDAR sensor;
integrate results from one or more of the first method, the second method and the point cloud registration including determining a weighted sum of a vector of difference values for six degrees of freedom; and
in response to one or more of the difference values exceeding a predetermined threshold, at least one of (i) identifying one or more of the first LIDAR sensor and the second LIDAR sensor as suspicious, or (ii) recalibrating the one or more of the first LIDAR sensor and the second LIDAR sensor.

12. The LIDAR-to-LIDAR alignment system of claim 11, wherein the autonomous driving module is configured to, based on knowing a transform from a first LIDAR sensor coordinate system to the vehicle coordinate system is accurate and the weighted sum of the vector of difference values, determine whether transform from a second LIDAR sensor coordinate system to the vehicle coordinate system is accurate.

13. A LIDAR-to-LIDAR alignment validation method comprising:

aggregating first points of data and second points of data in a vehicle coordinate system of a vehicle to provide aggregated LIDAR points, wherein the first points of data are provided based on an output of a first LIDAR sensor, and the second points of data are provided based on an output of a second LIDAR sensor, and wherein the aggregating of the first points of data and the second points of data includes:
performing point registration to map the first points of data at a first time in a coordinate system of the first LIDAR sensor at a second time,
aggregating the mapped first points of data from the first LIDAR sensor to provide first aggregated points,
performing point registration to map the second points of data at the first time in a coordinate system of the second LIDAR sensor at the second time,
aggregating the mapped second points of data from the second LIDAR sensor to provide second aggregated points,
mapping the first aggregated points to the vehicle coordinate system based on a rotation calibration value and a translation calibration value for the first LIDAR sensor, and
mapping the second aggregated points to the vehicle coordinate system based on a rotation calibration value and a translation calibration value for the second LIDAR sensor;
based on the aggregated LIDAR points, at least one of
performing a first method including determining pitch and roll differences between the first LIDAR sensor and the second LIDAR sensor,
performing a second method including determining a yaw difference between the first LIDAR sensor and the second LIDAR sensor, or
performing point cloud registration to determine rotation and translation differences between the first LIDAR sensor and the second LIDAR sensor;
based on results of at least one of the first method, the second method or the point cloud registration, determining whether one or more alignment conditions are satisfied; and
in response to the one or more alignment conditions not being satisfied, recalibrating at least one of the first LIDAR sensor or the second LIDAR sensor.

14. The method of claim 13, further comprising:
determining whether a plurality of enabling conditions are satisfied including two or more of
determining whether the vehicle is moving,
determining whether the vehicle is in a known location,
determining whether a velocity of the vehicle is greater than a predetermined velocity,
determining whether an acceleration rate of the vehicle is greater than a predetermined acceleration rate, or
determining whether a yaw rate is greater than a predetermined yaw rate; and
in response to the plurality of enabling conditions being satisfied, aggregating the first points of data and the second points of data.

15. The method of claim 13, further comprising:
based on aggregated LIDAR points, performing ground fitting and selecting to provide first selected points of the first LIDAR sensor in a ground area and second selected points of the second LIDAR sensor in the ground area; and
performing the first method based on the first selected points and the second selected points.

16. The method of claim 13, further comprising performing the first method and the second method and, based on results of the first method and the second method, determining whether the one or more alignment conditions are satisfied.

17. The method of claim 13, further comprising performing the point cloud registration and, based on results of the point cloud registration, determining whether the one or more alignment conditions are satisfied.

18. The method of claim 13, further comprising performing the first method, the second method and the point cloud registration and, based on results of the first method, the second method and the point cloud registration, determine whether the one or more alignment conditions are satisfied.

* * * * *